United States Patent [19]

Van Scoy

[11] 4,077,435
[45] Mar. 7, 1978

[54] PIPELINE PLUGGING APPARATUS

[75] Inventor: Davis A. Van Scoy, Houston, Tex.

[73] Assignee: Willard A. Sawyer, Tulsa, Okla.

[21] Appl. No.: 650,010

[22] Filed: Jan. 19, 1976

Related U.S. Application Data

[63] Continuation of Ser. No. 397,262, Sept. 14, 1973, abandoned.

[51] Int. Cl.² ............................................. F16L 55/12
[52] U.S. Cl. ...................................... 138/93; 138/89; 138/97
[58] Field of Search ............................. 138/89, 93, 97

[56] References Cited

U.S. PATENT DOCUMENTS

| | | | |
|---|---|---|---|
| 2,130,030 | 9/1938 | Richardson | 138/93 |
| 3,285,290 | 11/1966 | Morrison | 138/97 |
| 3,298,399 | 1/1967 | Slade | 138/97 |
| 3,431,946 | 3/1969 | Sawyer | 138/93 |
| 3,483,895 | 12/1969 | Barto | 138/97 |
| 3,495,626 | 2/1970 | Nagel | 138/97 |
| 3,503,424 | 3/1970 | Sawyer | 138/97 |
| 3,561,490 | 2/1971 | Little | 138/97 X |
| 3,690,348 | 9/1972 | Patterson | 138/97 |
| 3,726,319 | 4/1973 | Patterson | 138/93 X |

Primary Examiner—Richard E. Aegerter
Assistant Examiner—James E. Bryant, III
Attorney, Agent, or Firm—Bill B. Berryhill

[57] ABSTRACT

Apparatus for plugging a pipeline may comprise: a tubular body; seal assemblies carried by the body for moving the body through the pipeline in response to fluid flow therethrough and for sealing between the body and pipeline; an internal valve carried by the body for establishing fluid communication between downstream and upstream portions of the pipeline; and a stop device extendable into the pipeline for arresting movement of the body and for operating the internal valve. A method is disclosed for utilizing the apparatus.

15 Claims, 9 Drawing Figures

Fig-1

PIPELINE PLUGGING APPARATUS

CROSS-REFERENCE TO RELATED APPLICATION

The present application is a continuation of U.S. patent application Ser. No. 397,262, filed Sept. 14, 1973, now abandoned.

BACKGROUND OF THE INVENTION

1. Field of the Invention

The present invention pertains to pipelines and apparatus for use therewith. In particular, it pertains to apparatus for closing or plugging a section of pipeline in order to repair or work on such. In particular, the present invention pertains to apparatus suitable for isolating a section of pipeline under pressure without the necessity of draining the entire pipeline.

2. Description of the Prior Art

Occasionally it is necessary to work on sections of pipelines for various purposes, e.g., repairing leaks, replacing sections of pipe, installing or replacing valves, connecting branch lines, etc. In the past, it has been necessary to drain the pipeline or a substantial portion thereof in order to repair or perform any other maintenance on the line. This of course resulted in the time-consuming operation of draining the line and transporting the drain fluid to storage facilities. This also results in pump or compressor stations of the pipeline being completely shut down.

Within the past few years devices have been developed to isolate short sections of pipeline, eliminating the necessity for draining substantial lengths thereof. One such device comprises a plug member which is inserted through a lateral opening which has been previously cut in the pipeline by "hot tap" methods. The plug is inserted through the lateral opening and rotated so as to be in axial alignment with the pipeline and is then caused to expand into sealing engagement with the inner walls thereof. The lateral opening which is cut in the pipe for these type devices is substantially the same dimension as the inside diameter of the pipe. While offering certain advantages, this method introduces disadvantages such as the removal of a substantial amount of the pipe by cutting the lateral entry hole, thereby weakening the structural continuity of the pipe itself. Further, these devices are sometimes difficult to insert and remove from the pipeline, creating a possible hazard of permanently blocking the pipeline. Examples of such prior art may be seen in U.S. Pat. Nos. 2,929,410 and 3,285,290.

In other prior art, plugging devices have been provided for traveling inside the pipeline to a predetermined point, propelled by fluid flow within the pipeline. These devices, commonly referred to as "plugging pigs" are launched at some convenient point upstream and travel to a preselected downstream location where small diameter pins, relative to the pipe diameter, are extended into the pipe through valves connected to the pipe and through holes of approximately the same diameter as the pin which have been cut under pressure by "hot tapping" methods. Upon contact with the pin, the plugging pig will stop, at which time a seal or packer element thereon will be expanded sufficiently to establish sealing contact with the inner pipe wall. Various means are used to expand the seal, including the inflation of the seal by fluid connection with an external fluid pressure source through the pin. Examples of such prior art may be seen in U.S. Pat. Nos. 2,929,410 and 3,285,290.

When such prior art plugging pigs are used in pairs to isolate a section of pipeline, it is necessary to establish external fluid bypasses around the first pig, upon arrival at a predetermined pin location, in order to enable the second pig to approach. Such bypasses require at least three hot taps to be made, in addition to the pin device hot taps, in order to establish the desired fluid communication for operation of the two pigs. In addition, as previously stated, a rather complex design may be required to inflate the packer or sealing element from an external pressure source.

In a more recent development a plugging pig has been designed which incorporates an integral fluid bypass valve. Such a valve eliminates the necessity of the external bypasses previously required in the prior art to bring the second pig into position. This also reduces the number of holes in the pipeline and requires less welding. Furthermore, the integral bypass valve may be automatically actuated as the pig approaches its stop pin or restraining device, preventing undue hydraulic shock created by sudden stoppage of the pig. The ingtegral bypass valve is also designed for selective operation externally of the pipeline allowing much flexibility, including the automatic refilling of a newly repaired pipe section. Such a plugging pig and its method of use may be seen in U.S. Pat. No. 3,503,424.

SUMMARY OF THE INVENTION

The present invention pertains to improvements in the above described plugging pig of the integral fluid bypass valve type. Such a pig may comprises a central tubular body; seal means carried by the body for moving the plugging pig though the pipeline in response to fluid flow therethrough and for sealing between the pig and the pipeline; and integral bypass valve means carried by the body having an open position in which fluid communication is established between downstream and upstream portions of the pipeline, and a closed position in which the fluid communication is prevented. Stop means are provided for extension into the pipeline and operable externally thereof to arrest movement of the plugging pig through the piepline.

Like in the aforementioned U.S. Pat. No. 3,503,424, the plugging pig of the present invention incorporates an integral fluid bypass valve which may be automatically actuated as the pig approaches a stop pin, thereby preventing undue hydraulic shock created by sudden stoppage of the pig. Furthermore, no external bypass is required to bring the second pig into position. As earlier stated, this permits fewer holes in the pipe and less welding is required. However, in the improved version of the present invention, the integral bypass valve is pressure balanced and is much simplified in construction and operation. The valve is of the sliding sleeve type and is easily operated by a unique stop apparatus. Ports are provided in the central tubular body of the pig through which the internal bypass may be established. These ports, or port as it may be called, are provided by a circumferential slog completely surrounding the tubular body member. Thus, a considerably larger flow area is permitted in the present invention than in prior devices. The sleeve of the valve is normally biased toward a first position, in which the ports are blocked.

The stop means comprises at least one stop pin radially movable from a retracted position, in which the flow area of the pipeline is uninterrupted, to an extended position for engagement with a portion of the pig to arrest its movement through the pipeline. Further extension of the stop pin engages a locking flange around the tubular body, preventing movement of the pig in either direction. In addition, the stop pin is provided with a plunger means, which may be operated hydraulically or mechanically from a point outside of the pipeline, to open or close the valve. The plunger means may comprise a rod connected to a piston member which is disposed for reciprocating movement within a chamber in the stop pin. The plunger is movable from a retracted position, in which the valve is maintained in the closed position, to an extended position in which the sleeve member of the valve is moved to the second position, opening the valve and establishing fluid communication through the tubular body member. The plunger can be placed in the extended position before the pig reaches the stop pin, causing the valve to be automatically opened upon contact, preventing undue hydraulic shock created by a sudden stoppage of pigs.

In addition to the improved and simplified bypass valve design, the pig of the present invention utilizes a unique, self-energizing seal which may be actuated for expansion without requiring external inflation means. Cup type seal assemblies are mounted on the tubular body of the pig for propelling the pig through the line in response to fluid flow therethrough. The cup type seals may be slidably mounted on the body for limited axial movement relative thereto so as to axially compress and radially expand an intermediate expansible seal or packer when a suitable differential pressure exists across the pig with the bypass valve closed. The expansible seal may be of the spherical type and its interior may be in fluid communication with upstream fluid pressure by means of ports in the tubular body. Thus, the seal may be partially collapsible to enable the pig to traverse sharp bends. It is relatively inexpensive to produce and may be molded from high wear resistant materials. It is bidirectionally actuated with no external pressurizing source required. In addition, the expansible seal assists in propelling the pig and also assists in supporting the pig weight within the pipeline.

Many other objects and advantages of the present invention will be apparent from the description which follows in conjunction with the accompanying drawings.

DESCRIPTION OF PREFERRED EMBODIMENTS

Figure 1:
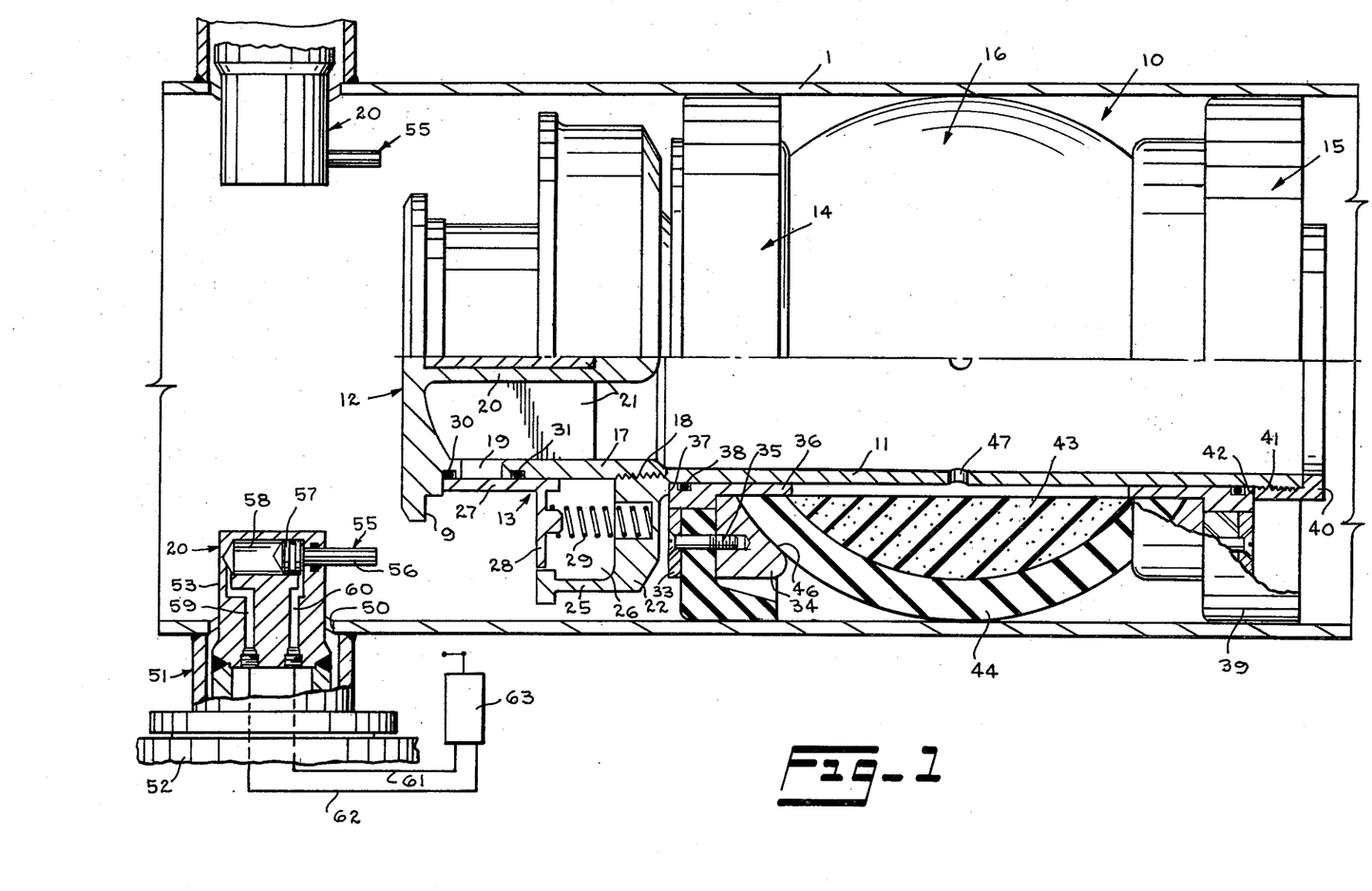
FIG. 1 is a partial sectional view of the pipeline plugging pig and associated stop apparatus of the present invention, illustrating the plugging pig during normal travel through a pipeline.
Figure 2:
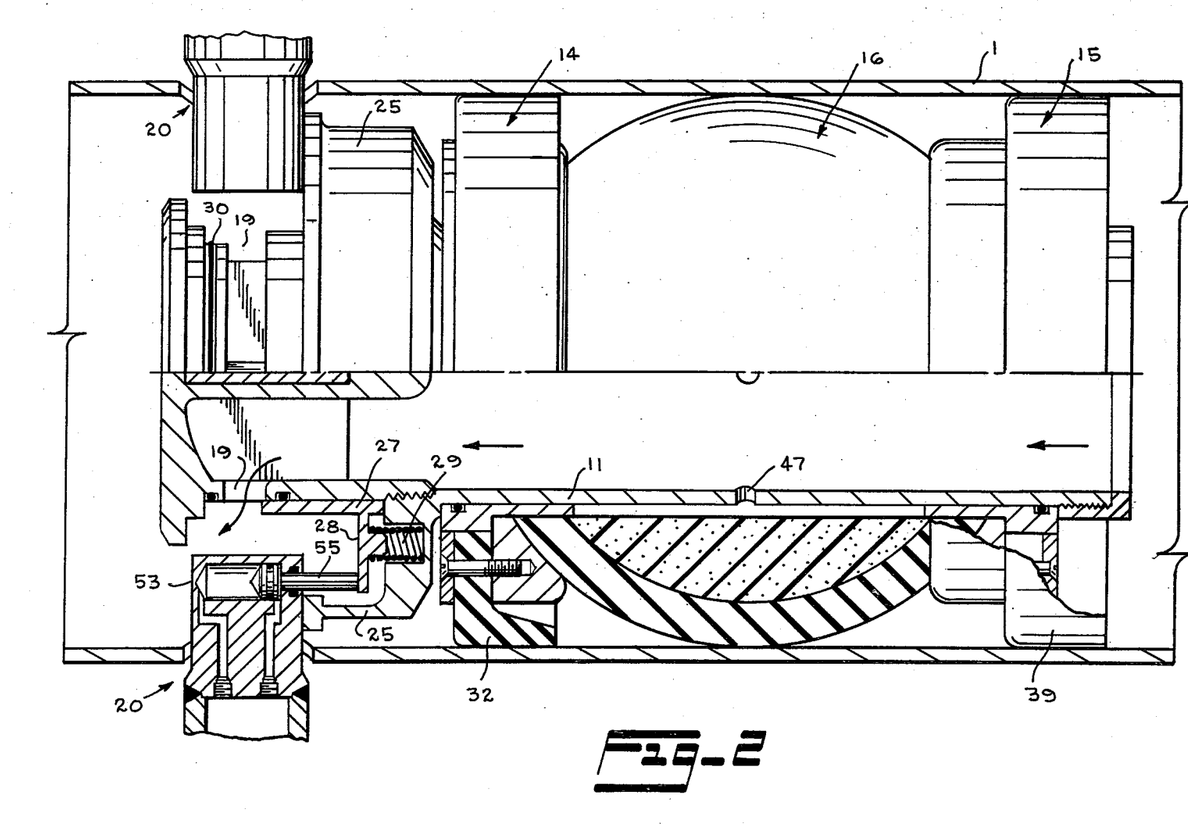
FIG. 2 is a partial sectional view of the plugging pig of FIG. 1 in position after being arrested by stop apparatus of the present invention and with its integral bypass valve opened.
Figure 3:
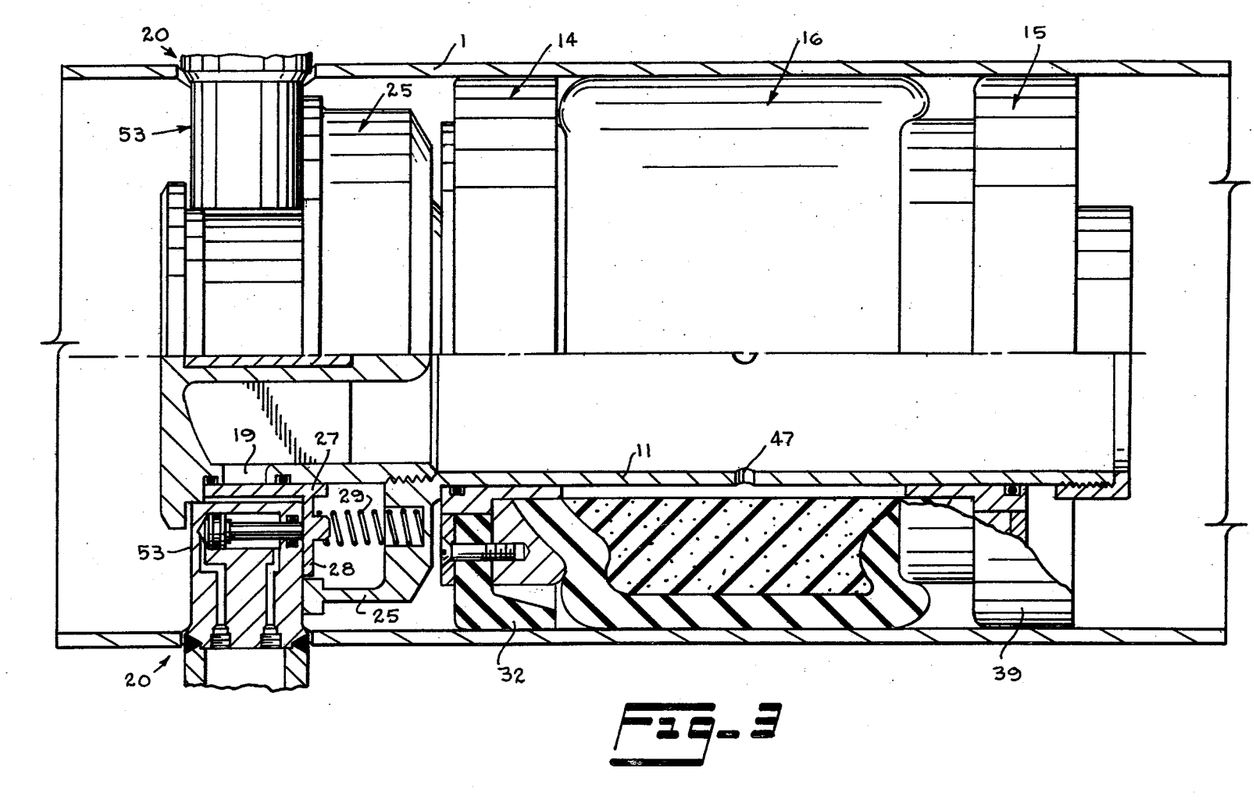
FIG. 3 is a partial sectional elevation view of the plugging pig of FIGS. 1 and 2 locked in place by the stop apparatus and with its bypass valve closed, to allow expansion of its expansible seal.

Referring first to FIGS. 1–3, a pipeline pig 10, according to a preferred embodiment of the invention, is shown traveling through a pipeline 1, through the walls of which project stop means 20, to be more fully described hereafter. The plugging pig 10 comprises in general, a central tubular body 11 closed at the forward end by a head member 12, a bypass valve 13, a pair of seal assemblies 14 and 15 and an intermediate expansible seal 16.

The head member 12 provides an annular locking surface 9, the purpose of which will be seen hereafter. The walls 17 of the head member 12 may be considered a part of the tubular body member 11 and could be integrally formed therewith. However, for assembly purposes these two tubular members may be attached by a threaded connection 18. A circumferential slot 19 may be cut through the walls 17 and serves as the ports or flow passage for the internal bypass valve 13. The head member 12 may also comprise a central core portion 12a from which a plurality of support vanes or members 21 radially project to the walls 17. Thus, except where interrupted by vanes 21, the port 19 completely surrounds the pig and provides a large flow area, which helps reduce hydraulic shock when movement of the pig is arrested within the pipeline, as will be seen hereafter.

Projecting radially from the tubular body means 11 is a bumper means which may comprise a radial flange portion 22 and a cylindrical skirt portion 25 surrounding an annular recess 26. The purpose of the bumper means will be more fully understood hereafter.

The valve 13 is of the sleeve type and comprises a sleeve 27 movable from a first position, as shown in FIG. 1, in which the ports 19 are blocked to a second position (see FIG. 2) in which the ports are unblocked permitting fluid communication between the downstream and upstream ends of the pig. The sleeve 27 is provided with a radial extension 28, the forward face of which will provide a bearing surface for operating the valve, as will be seen hereafter. The valve is biased toward the first or closed position by a spring member 29 which is disposed within the annular recess 26 and one end of which bears against the flange portion 22 of the bumper. If a sufficient force is applied to the flange portion 28 of the sleeve 27, the bias of the spring 29 may be overcome allowing the sleeve valve to open. Appropriate annular seals 30 and 31 may be provided to prevent leakage of the valve 13 in its closed position. Since the only sealing against the sleeve member 27 is at seals 30 and 31, it will be noted that the sleeve member 27 is completely pressure balanced. There are no sealing areas at the ends of the sleeve 27, and the same pressure exists at the opposite ends of the sleeve 27 whether the valve is closed, as in FIG. 1, or open, as in FIG. 2. Since the lateral area at the opposite ends of sleeve 27 are equal, the forces acting thereon are equal and in opposite axial directions. Thus, only the biasing force of spring 29 need be overcome in opening the valve. Prior devices require overcoming force created by differential line pressure.

The annular seal assemblies 14 and 15 are substantially the same and will now be described with reference to the assembly 14. The primary seal element 32 of the assembly 14 is of the cup type having a lip portion 32a which points in an upstream direction, preventing flow of fluid by the seal assembly in a downstream direction. Thus, the pig 10 will be caused to flow in a downstream direction, with the fluid flow of the pipeline. The sealing element 32 may be sandwiched between a pair of retainer rings 33 and 34 connected by suitable means such as screws 35. The seal element and retainer rings 33 and 34 are mounted around and carried on a cylindrical member 36. The internal diameter of cylindrical member 36 is slightly greater than the external diameter of tubular body member 11 and may slidingly reciprocate thereon within certain limits. This movement is limited toward the forward end by annular stop shoulder 37. An O-ring seal 38 may be provided to prevent leakage past seal assembly 14.

The second seal assembly 15 is almost identical to the seal assembly 14. All elements are reversed except the seal element 39 which is identical to seal element 32. A retainer ring 40 may be threadedly connected at 41 to the tubular body member 11. Thus, an annular stop surface 42 is also provided to limit axial movement of the seal assembly 15. In addition, removal of the retainer ring 40 permits assembly and replacement of the seal assemblies of the pig 10.

Also carried on the tubular body member 11 between the annular seal assemblies 14 and 15 is the expansible seal assembly 16. The expansible seal assembly 16 shown in the drawings is of the spherical type. However, it should be understood that a cylindrically shaped type could also be used. The expansible seal 16 may comprise a core 43 of relatively soft material, such as polyurethane foam, surrounded by an outer layer 44. The outer layer 44 is preferably of a harder polyurethane or any other suitable material, e.g. neoprene. It will be noted that the inner retainer rings, such as 34, of the seal assemblies 14 and 15 are provided with spherical surfaces 46 for bearing against a portion of the outer layer 44 of the expansible seal 16. It can easily be seen that if sufficient oppositely directed forces are acting on seal assemblies 14 and 15, the axial dimension of spherical seal 16 will be contracted, causing the assembly to expand against the inner walls of the pipeline 1 creating a fluidtight seal therebetween. In addition, the interior of the seal assembly 16 is in fluid communication with the interior of tubular body 11 through ports 47, allowing the pressure within tubular body 11 to assist in expanding the seal assembly 16.

Thus, the seal of the pig of the present invention is self-energizing and requires no external inflation means as in the prior art. The cup type seal assemblies 14, 15 propel the pig through the line and when the pig movement is arrested applies mechanical force to axially compress and radially expand the expansible seal 16 when a suitable differential in pressure exists across the pig. During travel through the pipeline, the seal 16 is partially collapsed, enabling the pig to traverse sharper bends. In addition, the seal assembly 16 assists the other seal assemblies 14 and 15 in propelling the pig through the pipeline and also assists in supporting the pig weight. Seal 16 may be spherical, cylindrical, or a combination of both, in shape and may be inexpensively molded from high wear resistant materials.

A necessary part of the invention is the stop means 20. When a point is selected at which the pig 10 is to be stoped, one or more holes 50 may be cut in the walls of the pipeline 1 by hot tapping methods. In such methods, a nozzle and flange assembly 51 may be welded to the pipeline. Then a valve is attached thereto through which a drilling device may be inserted for cutting through the pipeline wall. Pressure protection is maintained throughout this procedure. This procedure is well known in the prior art and will not be further discussed herein.

As mentioned, a valve 52 is attached to the nozzle and flange assembly 51. Attached to the valve 52 may be a mechanical or hydraulically operable unit (not shown) for manipulating the pin member 53. Such units are known in the prior art and may be seen, for example, in the aforementioned U.S. Pat. No. 3,503,424. For present purposes, it is sufficient to note that the pin member 53 may be moved with such a unit from a retracted position, in which the flow area of the pipeline 1 is uninterrupted, to an extended position, as shown in FIG. 1. As will be seen hereafter, it may also be moved to a further extended position.

The stop means 20 also comprises a plunger member 55 which may comprise a rod portion 56 at one end of which is a piston portion 57. The piston 57 may be mounted in a chamber 58 within pin member 53 for reciprocating movement along an axis which is substantially parallel to the axis of the pipeline 1 and tubular body member 11. When the piston member 57 is at one end of the chamber the rod member 56 extends toward pig 10 (see FIG. 1). When the piston member 57 is at the opposite end of the chamber 58, the rod 56 is retracted within the pin member 53 (see FIG. 3). Ports 59 and 60 may be provided for supplying operating fluid to the plunger 55. These ports may be connected by suitable conduits 61, 62, schematically shown in FIG. 1, connected to a suitable control valve 63. The valve 63 is in turn connected to a fluid pressure source (not shown). When pressure is applied through port 59, the plunger is extended as shown in FIG. 1. When pressure is applied through the port 60, the plunger would be retracted as shown in FIG. 3. Although the plunger 55 has been shown for hydraulic operation, it could be adapted for mechanical or even electrical operation.

STATEMENT OF OPERATION

Figure 4:
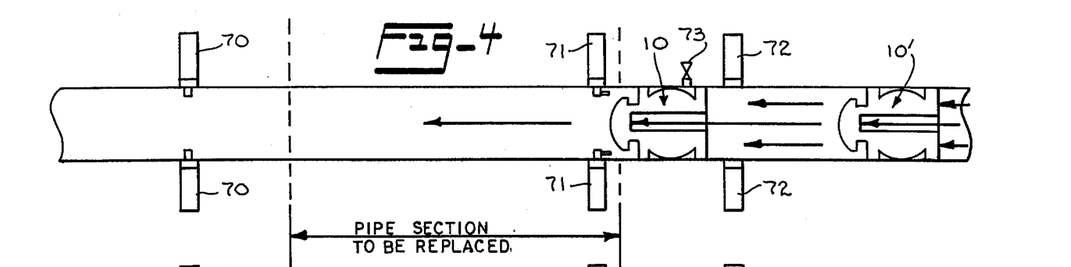
FIGS. 4–9 are step-by-step schematic views depicting a method of repairing a section of pipeline with a pair of plugging pigs, according to preferred embodiments of the invention.
Figure 5:
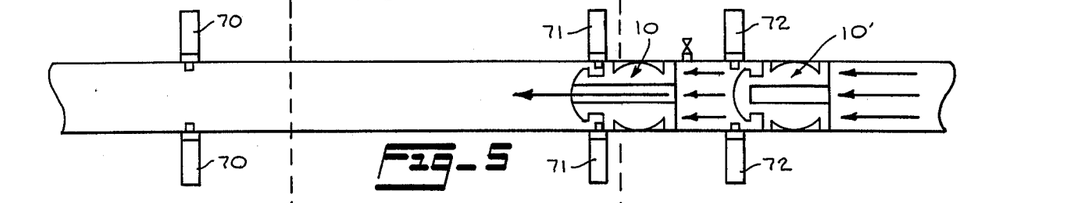

Referring now to FIGS. 4–9, in conjunction with FIGS. 1–3, the operation and method of the present invention will be described. As shown in FIG. 4, a section of pipe is to be replaced.

Stop pin units 70, 71 and 72, similar to the units 20 described with reference to FIG. 1, are first installed at required locations. The units 70 are installed at a location slightly downstream of the pipe section to be replaced. The units 72 are installed at a position slightly upstream of the section to be replaced. The units 71 are installed at some intermediate position, preferably fairly close to upstream station units 72. A vent connection 73 may also be installed at a point between the upstream and intermediate pin stations. The pin and plunger members of the intermediate station pin units 71 are positioned in the extended position, such as 53 and 55 respectively in FIG. 1.

Two pigs 10 and 10', of the design shown in FIGS. 1–3, are then inserted into the pipeline at any convenient upstream pig launching site. The pigs are normally launched fifteen to thirty minutes apart. The distance upstream may be anywhere from a few hundred feet to many miles. The bypass valves of each of the pigs 10 and 10' are closed allowing the pipeline flow and seal units to propel the pigs through the pipeline.

As the first pig 10 arrives at the intermediate station 71, its internal bypass valve is automatically opened. As can best be seen in FIG. 2, this is due to the fact that the plunger 55, which is in the extended position, contacts the bearing plate 28 of the sleeve valve 27 moving the valve from the closed to the open position shown in FIG. 2. This accomplishes two things. First, it acts as a shock reducing device to reduce the hydraulic shock that would otherwise occur upon arresting travel of the pig 10 through the pipeline. Secondly, it allows flow of fluid through the tubular body 11 and ports 19 as the second pig 10' approaches the first pig. Thus, fluid may be displaced between the pigs without the external bypass arrangements of the prior art. As the sleeve valve is opened, cushioning hydraulic shock, the pig 10 continues for a slight distance until the bumper skirt 25 engages stop pin 53, finally arresting further downstream movement of the pig.

After movement of the first pig 10 has been arrested and its internal bypass valve opened, the pin members of the upstream station pin units 72 are extended to arrest movement of the second pig 10'. The plungers of the pin units 72 may also be extended to cushion hydraulic shock caused by the arriving pig 10'. As previously mentioned, fluid between the pigs 10 and 10' is displaced through the internal bypass valve of the first pig. After movement of the second pig has been arrested, its valve may be closed and the pig locked against movement in either direction by futher extension of the pin units to the positions shown in FIG. 1. Since the internal bypass valve is closed and since movement of the pig is arrested, axial forces will be applied to the annular seal assemblies, such as 14 and 15, causing the intermediate spherical seal 16 to sealingly engage the pipeline walls. As previously pointed out, this sealing is also aided by communication between upstream pressure and the interior of the seal assembly 16 through ports 47.

Figure 6:
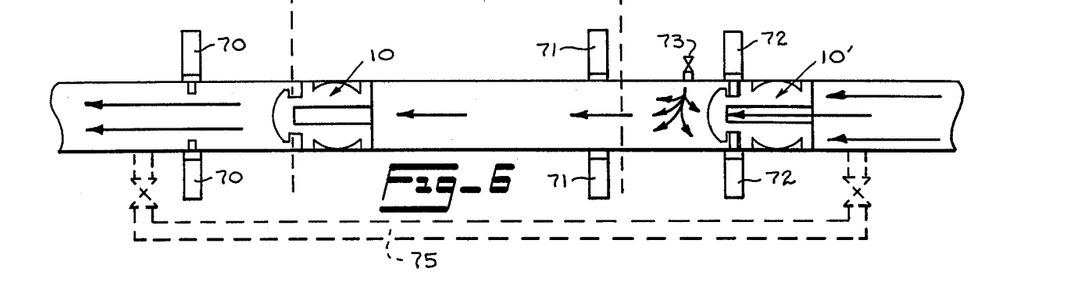

After the second pig 10' has been locked in place, the internal bypass valve of the first pig 10 may be closed, by retracting the plungers 55, and the pin unit 71 may be retracted. Then an inert gas, such as nitrogen, may be introduced through connection 73 to propel the first pig 10 toward the downstream station 70 whose pin members have been extended, as in FIG. 1, to arrest movement of the pig 10. In this case, however, the plungers may be retracted to prevent opening of the bypass valves and intermingling of the inert gas with pipeline fluids downstream. Since the introduction of inert gas may be easily regulated, very little shock will be experienced upon arresting movement of the first pig at the downstream station 70. See FIG. 6. Displacing of the first pig with the inert gas also automatically evacuates the line contents from the section of pipeline to be replaced. Although one is not needed, an external bypass 75 can be installed as shown in FIG. 6 if it is desired to maintain flow through the pipeline while work is being done.

Once the movement of the first pig is arrested at the downstream station 70, the pin units are further extended, as in FIG. 3, locking the first pin in position with its internal bypass valve closed. The differential pressures across the pig causes the first pig expansible seal to sealingly engage the pipeline in a fluidtight connection. One desirable feature of the seal of the pig of the present invention is that it is bidirectional in operation. Thus, a seal can be maintained whether pressure is greater on one side of the pig or the other.

Figure 7:
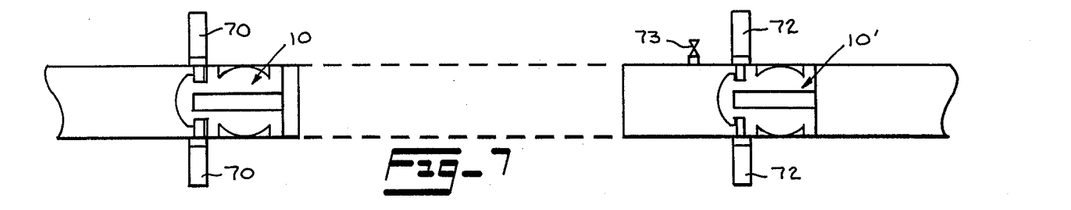
Figure 8:
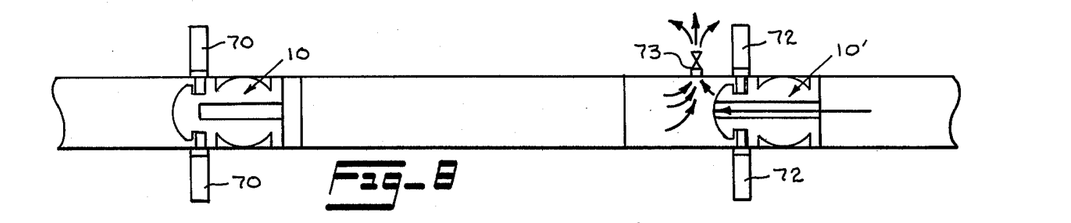
Figure 9:
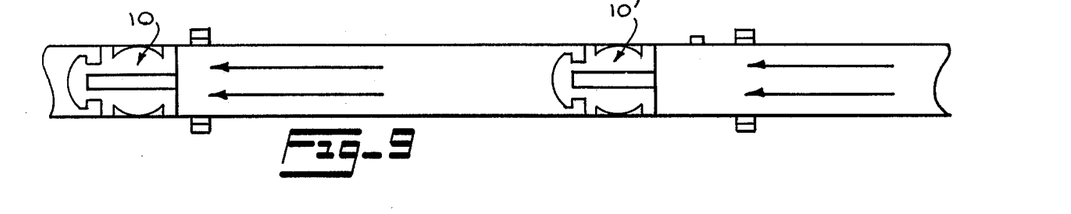

With both pigs locked in position and with their bypass valves closed, the pipe section to be replaced can be cut out of the line, as shown in FIG. 7. A new section may be safely welded into place and the welds tested while holding high test pressures.

After the new section has been welded in place, the internal bypass valve of the second pig 10' is opened by actuation of the plungers of the pin unit 72. This allows the new pipeline section to be filled with line fluid and equalizes the pressure across the pigs. As the line fluid fills the new section, any air or other gas may be vented through the vent connection 73.

When the new section is completely filled, the bypass valve of the second pig is again closed, by retracting the plungers of pin units 72 and the pins of all pin units are retracted, releasing the pigs for pumping to downstream receiving traps. All pin units may then be removed and the nozzle fittings to which they were attached may be blinded over.

It should here be noted that the intermediate pin station 71 could be eliminated if desired. In such a case the first pig would be sent directly to the downstream station 70. However, in such a method it would be necessary to remove pipeline fluids trapped between the pigs by pumping out the section to be repaired.

From the foregoing description, it can be seen that the method of replacing a section of pipeline as described herein is much superior to the prior art. No external bypass arrangements are required. Fewer strength reducing holes are required in the pipe. Less welding is required. Automatic evacuation and refilling of the pipe section is accomplished.

This method is made possible by the use of the unique and improved plugging pig of the present invention. The novel sleeve type, pressure-balanced, internal bypass valve and the novel bidirectional, self-energizable seal of this pig is superior to any of those of the prior art. In addition to replacing sections of pipeline, a pair of the pigs of the present invention may be used to replace or repair valves, install lateral connections or special fittings, tie-in booster stations, install detectors or other special equipment, etc. The pigs may be used in pairs with either two or three stop pin stations. If only two stop pin stations are employed, it will ususally be necessary to pump out the line fluid trapped between pigs. A single pig may be used for replacement of scraper trap assemblies, replacement of block valves, installation of lateral lines and tie-ins, and hydrostatic testing. In fact, the pig of the present invention is extremely versatile and flexible.

Although only one embodiment and method of use of the invention have been described herein, many modifications and uses can be made without departing from the spirit of the invention. It is therefore intended that the scope of the invention be limited only by the claims which follow.

I claim:
1. Apparatus for plugging a pipeline comprising:
   (a) tubular body means, one end of which is closed by a head member, the other end of which is open;
   (b) seal means carried by said body means for moving said body means through said pipeline in response to fluid flow therethrough and for sealing between said body means and said pipeline;
   (c) ports through the walls of said tubular body means between said head member and said seal means for providing fluid communication between a portion of said pipeline downstream of said seal means and a portion upstream of said seal means;
   (d) valve means carried by said body means and including a cylindrical sleeve member sealingly en- gaging the exterior of said body means between said head member and said seal means and movable between a first position in which said ports are sealingly closed by said sleeve member and a second position in which said ports are opened, said cylindrical sleeve member having equal and balanced pressure areas at its opposite ends so that pressure forces acting on said sleeve member, in upstream and downstream directions, regardless of any differential pressure between said upstream and downstream portions of said pipeline, are substantially equal whether said valve is in said first or second positions; and (e) stop means extendable into said pipeline and operable externally thereof to arrest movement of said body means through said pipeline and to engage said valve means for moving said sleeve member between said first and second position, said first position permitting any differential fluid pressures which may exist between said downstream and upstream pipe portions to expand said seal means, providing fluidtight sealing engagement of said seal means with inner walls of said pipeline.

2. Apparatus as set forth in claim 1 in which said head member comprises a central core portion, disposed along a central axis of of said tubular body means and a plurality of support ribs projecting radially therefrom to the inner walls of said tubular body means.

3. Apparatus as set forth in claim 1 including bumper means projecting radially from said tubular body means and engageable with said stop means for arresting said movement of said body means through said pipeline.

4. Apparatus as set forth in claim 3 in which said bumper means comprises a radial flange portion and a cylindrical skirt portion forming an annular recess in which a portion of said sleeve member is received for axial movement between said first and second positions.

5. Apparatus as set forth in claim 3 in which said valve means comprises biasing means between said sleeve member and said bumper means biasing said sleeve member toward said first position.

6. Apparatus as set forth in claim 3 in which said stop means comprises a pin member radially movable between a retracted position, in which said stop means is clear of the interior of said pipeline allowing uninterrupted passage of said body means through said pipeline, and an extended position for said engagement with said bumper means to arrest said movement of said body through said pipeline.

7. Apparatus as set forth in claim 6 in which said tubular body means includes an annular shoulder therearound, said pin member being radially movable to a further extended position in which said pin member is engageable with said annular shoulder for preventing reverse movement of said body means through said pipeline.

8. Apparatus as set forth in claim 6 in which said stop means includes plunger means movable along an axis substantially parallel with the axis of said tubular body means from a retracted position to an extended position engaging said sleeve member and moving said sleeve member between said first and second positions.

9. Apparatus as set forth in claim 8 in which said plunger means is carried by said pin member and movable along an axis substantially perpendicular to the axis of said pin member.

10. Apparatus as set forth in claim 9 in which said plunger means comprises a rod member at one end of which is a piston member mounted for limited movement in a cylindrical chamber formed in said pin member, said chamber being connected to a source of pressurized fluid for moving said plunger means between said retracted and extended positions.

11. Apparatus as set forth in claim 1 in which said seal means comprises at least one annular seal assembly carried on said body means and adjacent to which is carried an expansible seal assembly, said annular seal assembly being adapted to seal against the inner walls of said pipeline to prevent flow of fluid by said annular seal assembly in a downstream direction so as to force said body means in a downstream direction, said annular seal assembly also being mounted on said tubular body means for limited axial movement thereon, upon said arresting of said body means by said stop means, in response to said differential fluid pressures existing between said downstream and upstream pipe portions to axially contract said expansible seal assembly and causing said expansible seal assembly to radically expand into said fluidtight sealing engagement with said inner walls of said pipeline.

12. Apparatus as set forth in claim 11 in which there are a pair of said annular seal assemblies axially spaced on opposite sides of said expansible seal assembly, both of said annular seal assemblies being mounted on said tubular body means for limited axial movement thereon so that, upon said arresting of movement of said body means by said stop means, said expansible seal assembly is axially contracted causing said expansible seal assembly to radially expand into said fluidtight sealing engagement with said inner pipeline walls whether said downstream pressure is smaller or greater than said upstream pressure.

13. Apparatus as set forth in claim 11 in which the interior of said expansible seal assembly is in fluid communication with fluid pressure in said upstream portion of said pipeline through other ports in said tubular body means.

14. Apparatus as set forth in claim 13 in which said expansible seal comprises a central core of a relatively soft material surrounded by a layer of relatively hard sealing material.

15. Apparatus for plugging a pipeline comprising:
(a) tubular body means;
(b) seal means carried by said body means for moving said body means through said pipeline in response to fluid flow therethrough and for sealing between said body means and said pipeline;
(c) valve means carried by said body means having an open position, in which fluid communication is established through said tubular body means, between downstream and upstream portions of said pipeline, and a closed position in which said fluid communication is prevented, said valve means being biased toward said closed position;
(d) stop means comprising a pin member radially movable from a retracted position, in which movement of said body means is unimpaired, to an extended position engageable with bumper means attached to said body means to arrest movement of said body means through said pipeline, said pin member being radially movable to a further extended position engaging a locking surface carried by said body means, preventing movement of said body means in either an upstream or downstream direction; and (e) plunger means carried by said stop means engageable with said valve means and reciprocable along an axis substantially parallel with the axis of said tubular body means between a retracted position and an extended position in which said valve means is closed and opened, respectively, said plunger means comprising a rod member to one end of which is attached a piston member, said piston member being mounted for reciprocable movement in a cylindrical chamber formed in said pin member and which is in fluid communication with a fluid pressure source, said rod member maintaining said valve means in said opened position when said plunger means is in said extended position and said pin member is in either of said extended or said further extended positions.

* * * * *